(12) United States Patent
Onodera et al.

(10) Patent No.: US 11,991,733 B2
(45) Date of Patent: May 21, 2024

(54) COMMUNICATION DEVICE AND COMMUNICATION METHOD FOR HANDOVERS

(71) Applicant: Honda Motor Co., Ltd., Tokyo (JP)

(72) Inventors: Satoshi Onodera, Minato-ku (JP); Toshiaki Takano, Minato-ku (JP)

(73) Assignee: Honda Motor Co., Ltd., Tokyo (JP)

( * ) Notice: Subject to any disclaimer, the term of this patent is extended or adjusted under 35 U.S.C. 154(b) by 567 days.

(21) Appl. No.: 17/173,432

(22) Filed: Feb. 11, 2021

(65) Prior Publication Data

US 2021/0176768 A1 Jun. 10, 2021

Related U.S. Application Data

(63) Continuation of application No. PCT/JP2019/014297, filed on Mar. 29, 2019.

(51) Int. Cl.
*H04W 72/542* (2023.01)
*H04W 72/0453* (2023.01)

(52) U.S. Cl.
CPC ..... *H04W 72/542* (2023.01); *H04W 72/0453* (2013.01)

(58) Field of Classification Search
None
See application file for complete search history.

(56) References Cited

U.S. PATENT DOCUMENTS

| | | | |
|---|---|---|---|
| 2009/0280816 A1 | 11/2009 | Unno et al. | |
| 2010/0075689 A1 | 3/2010 | Uemura et al. | |
| 2016/0014793 A1* | 1/2016 | Klemp | H04W 48/18 370/329 |
| 2017/0280335 A1 | 9/2017 | Wilhelm et al. | |
| 2019/0253878 A1* | 8/2019 | Yu | H04W 74/08 |

FOREIGN PATENT DOCUMENTS

| | | |
|---|---|---|
| CN | 10161320 A | 12/2009 |
| CN | 103997763 A | 8/2014 |
| CN | 105187445 A | 12/2015 |
| EP | 2120475 | 11/2009 |
| JP | 2009171612 A | 7/2009 |
| JP | 2015154398 A | 8/2015 |

(Continued)

OTHER PUBLICATIONS

International Search Report of related international application PCT/JP2019/014297, dated Jun. 4, 2019.

(Continued)

*Primary Examiner* — Saad Khawar

(74) *Attorney, Agent, or Firm* — Aaron Fong; American Honda Motor Co., Inc.

(57) ABSTRACT

A base station receives information regarding a communication quality of communication of a first other communication device and information regarding a frequency condition of the communication, and provides the information regarding the communication quality of the communication and information on a frequency condition in the communication to a second other communication device. The second other communication device performs communication using the information regarding the communication quality and the information regarding the frequency condition.

19 Claims, 3 Drawing Sheets

(56) References Cited

FOREIGN PATENT DOCUMENTS

| JP | 2016-058992 A | 4/2016 |
| JP | 2017034635 A | 2/2017 |
| JP | 2017216663 A | 12/2017 |
| WO | WO2008093621 A1 | 8/2008 |

OTHER PUBLICATIONS

English Translation of International Search Report of related international application PCT/JP2019/014297, dated Jun. 4, 2019.
Written Opinion of the International Searching Authority of related international application PCT/JP2019/014297, dated Jun. 4, 2019.
Supplementary Search Report for Related European Application EP19922897, dated Mar. 11, 2022.
Notice of Reasons for Refusal from Japan Patent Office for Japanese Patent Application No. 2021-511742, dated Aug. 12, 2022.
Communication from the Examining Division of Related European Application EP19922897, dated Dec. 21, 2022.
Notice of Reasons for Refusal from Japan Patent Office for Japanese Patent Application No. 2021-511742, dated Nov. 21, 2022.
The first review of the opinion of the notice from Chinese Patent Office for CN Patent Application No. 201980094147.2, dated Apr. 28, 2023.

* cited by examiner

COMMUNICATION DEVICE AND COMMUNICATION METHOD FOR HANDOVERS

RELATED DISCLOSURE

This disclosure is a continuation of International Patent Application No. PCT/JP2019/014297 filed Mar. 29, 2019 titled Communication Device, Communication Method, and Program, which is hereby incorporated by reference in its entirety.

FIELD

The present disclosure relates to handover technology, and more particularly, to handovers based on communication environment recognition using communication quality and frequency conditions.

BACKGROUND ART

Remote operation may allow an operator who is located at a remote place to operate and move a vehicle. One element of remote operation may be the ability to sufficiently suppress communication delays between an operator device operated by an operator who performs the remote operation and a terminal device mounted on a vehicle.

It is assumed that a cellular wireless communication network in which a communication area has been deployed throughout an entire region may be used for communication to perform vehicle traveling control through a remote operation. In this case, since a terminal device mounted in the vehicle moves with the movement of the vehicle, it may be difficult to continuously maintain the connection with one base station. Thus, the terminal device operates to appropriately execute a handover process for switching the connection from a base station to another base station and maintain a connection with the network (and a connection with an operator device).

Even when the communication quality such as communication delay is sufficiently good between the terminal device and the base station being connected, there may be cases where the communication quality may not be good to an acceptable extent between the terminal device and the base station after the handover. Therefore, it is important to provide a mechanism for the terminal device to continue communication in an environment where sufficiently good communication quality such as communication delay is ensured.

SUMMARY

According to one aspect of the present disclosure, a communication device is provided. The communication device may include a memory for storing computer readable code and a processor operatively coupled to the memory, the processor configured to perform processes. The processes may include receiving information regarding a communication quality of communication of a first other communication device and information regarding a frequency condition of the communication and providing the information regarding the communication quality of the communication by the first other communication device and the frequency condition of the communication to a second other communication device. The second other communication device may perform communication using the communication quality and the frequency condition by the first other communication device.

In accordance with yet another aspect of the present disclosure, a communication device is provided. The communication device may include a memory storing instructions when executed by a processor causes the processor to perform processes. The processes may include receiving information regarding a communication quality of communication of a first other communication device and information regarding a frequency condition of the communication and providing the information regarding the communication quality of the communication by the first other communication device and the frequency condition of the communication to a second other communication device. The second other communication device may perform communication using the communication quality and the frequency condition by the first other communication device.

In accordance with yet another aspect of the present disclosure, a computer-implemented handover method in a communication device is provided. The method may include receiving information regarding a communication quality of communication of a first other communication device and information regarding a frequency condition of the communication and providing the information regarding the communication quality of the communication by the first other communication device and the frequency condition of the communication to a second other communication device. The second other communication device may perform communication using the communication quality and the frequency condition by the first other communication device.

BRIEF DESCRIPTION OF THE DRAWINGS

The accompanying drawings are included in the specification and constitute a part thereof, and illustrate an embodiment of the present disclosure and are used to explain the principles of the present disclosure, together with the description.

DETAILED DESCRIPTION

Figure 1:
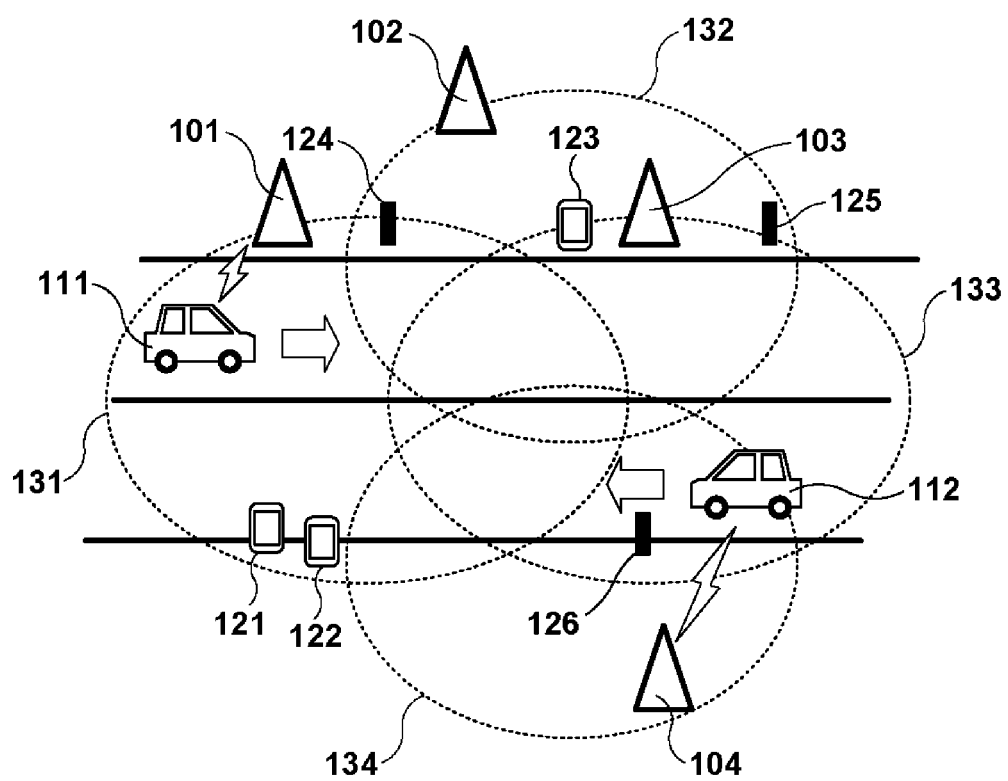
FIG. 1 is a view illustrating a system configuration example in accordance with one aspect of the present disclosure.

Embodiments will be described in detail below with reference to the accompanying drawings. Note that the following embodiments are not intended to limit the disclosure according to the Claims, and all of the combinations of the features described in the embodiments may not be essential to the disclosure. Two or more features of the plurality of features described in the embodiments may be arbitrarily combined. Furthermore, the same reference numerals denote the same or similar configurations, and redundant descriptions thereof will be omitted.

Generally described, the present disclosure enhances the probability in which communication by a communication path with good communication quality is continued. In an illustrative embodiment, a communication device according to one aspect of the disclosure provides information regarding communication quality of communication by a first other communication device and frequency conditions in the communication to a second other communication device. Through this information, the probability in which communication by an environment with good communication quality is continued may be enhanced. Other features and advantages of the present disclosure will become apparent from the following description with reference to the accompanying drawings.

FIG. 1 illustrates a configuration example of a communication system according to the present disclosure. The communication system is, for example, a cellular wireless communication system, and is configured to include base stations 101, 102, 103, and 104 and terminal devices 111 and 112 and 121, 122, 123, 124, 125, and 126. Note that, as an example, each of the terminal devices 111 to 112 is an in-vehicle terminal device mounted on a vehicle, each of the terminal devices 121 to 123 is a mobile terminal device such as a smart phone, and each of the terminal devices 124 to 126 is a fixed terminal device. The terminal devices 124 to 126 may be used to measure radio quality such as, for example, a communication delay at the arranged position. In the example illustrated in FIG. 1, an example in which the terminal devices 124 to 126 are arranged on a road shoulder is shown, however, the terminal devices may be arranged on a medial divider instead of the road shoulder, or for example, may be embedded in a road surface. The terminal devices 124 to 126 may be arranged at a position away from the road. Note that the terminal devices illustrated in FIG. 1 are illustrated as an example of terminal devices of various types, and the terminal devices are not limited thereto. The base stations 101, 102, 103, and 104 respectively form cells 131, 132, 133, and 134, and connect to a terminal device in a cell formed by the base station to perform wireless communication. Note that the terminal device connects to any of the base stations forming the cell that covers the position of the terminal device itself to perform wireless communication. That is, the cell may be disposed so as to overlap other cells in at least a part of the cell, and the terminal device connects to the base station forming any of the cells in the overlapping area. In one example, the base station 101 to 104 may be a base station (gNodeB) of a fifth generation (5G) cellular communication system, and the terminal device 111 to 112 and the terminal device 121 to 126 may be a terminal (UE) of a 5G cellular communication system. However, this is not the sole case, and the communication devices may comply with LTE (Long Term Evolution) or other generation cellular communication standards. The base station 101 to 104 may be a base station directly connected to a core network (e.g., Evolved Packet Core (EPC)), or may be a relay station wirelessly connected to another base station.

Note that in the present disclosure, an example of a case in which terminal devices 111 to 112 mounted on a vehicle perform wireless communication such as a remote operation to perform traveling control of the vehicle, and the like will be described. However, this is merely an example, and a control for an arbitrary terminal device (e.g., terminal devices 121 to 123) having a wireless function of being able to connect to a cellular communication network such as a smart phone, a mobile phone, a personal computer, and the like to execute a predetermined operation may be performed based on a procedure described below. Furthermore, generally, one base station forms a plurality of cells, however, in the present disclosure, an example in which one base station forms one cell is shown. Note that in the following description, in a case where the base station transmits information to the terminal device, the information may be transmitted for each cell. In other words, in a case where the base station forms a plurality of cells, information may be transmitted a plurality of times for each cell.

In the example of FIG. 1, a case where the terminal device 111 exists within a range of the cell 131 formed by the base station 101, and connects to the base station 101 to perform wireless communication is shown. In the example of FIG. 1, a case where the terminal device 112 exists within a range of the cell 134 formed by the base station 104, and connects to the base station 104 to perform wireless communication is shown. Although the position of the terminal device 112 is also within the range of the cell 133 formed by the base station 103, the terminal device 112 may connect to the base station 104 due to reasons such as, for example, the radio quality of the signal from the base station 104 being higher than the radio quality of the signal from the base station 103.

Furthermore, the terminal devices 121 to 126 also connect to the base station that forms the cell where the terminal device itself exists, similar to the terminal devices 111 and 112.

In the present disclosure, the terminal device executes a predetermined control process using information on communication quality such as radio quality and communication delay between the terminal device and a communication opposing device such as an operator device (not illustrated) operated by an operator who performs the remote operation. Note that the communication quality here is an actual measured quality such as actual measured communication delay and radio quality (signal to interference and noise power ratio (SINR), signal to noise ratio (SIR), reference signal reception power (RSRP), reference signal reception quality (RSRQ), received signal strength indication (RSSI), etc.) and the like measured at the time of actual communication. In one example, the predetermined control process may be control for automatic operation or remote operation. For example, the terminal device executes a limited control such as, for example, stop control or acceleration/deceleration control when the radio quality is relatively low or when the communication delay is large. On the other hand, when the radio quality is relatively high or when the communication delay is small, the terminal device executes a control of high degree of freedom such as, for example, lane change control. Furthermore, the predetermined control process may be a selection control of the base station to which the terminal device is connected. For example, the terminal device may connect to a base station corresponding to a path capable of sufficiently reducing the communication delay.

The base station according to the present disclosure notifies the terminal device of information indicating the actual measured communication quality obtained when the other terminal device has connected to the base station and communicated in the past. At this time, the communication quality between the base station and the terminal device may vary greatly depending on the frequency conditions used. Compared to a relatively low frequency band such as, for example, the 800 MHz band, radio waves in a relatively high frequency band, such as the 6 GHz band, tend to have a large distance attenuation and are strongly subjected to the influence of shielding. That is, when radio waves of a low frequency band and a relatively high frequency band are emitted from the same position, the radio waves in the relatively low frequency band are received at a predetermined power level, whereas the radio waves in the relatively high frequency band tend to be received at a power level lower than the predetermined power level. Furthermore, as a result of the straightness of the radio waves enhancing with increase in frequency, the radio waves in the relatively high frequency band may not reach a shadow position of a building or the like at a sufficient power level. Furthermore, for example, the radio waves in the 60 GHz band are known to have large rain attenuation, and the radio waves in the frequency band close to the light are known to attenuate greatly by the mist. Thus, in a case where the base station device collects the communication quality without distinguishing the differences of such frequency conditions and notifies the terminal device, the received communication quality and the communication quality that may actually be received by the terminal device may be deviated depending on the frequency conditions actually used in the communication by the terminal device.

Thus, the base station of the present disclosure provides information related to the communication quality when the base station has communicated with the first terminal device in the past, and the frequency conditions in such communication to the second terminal device. In this way, the terminal device may recognize to what frequency condition the provided information regarding the communication quality corresponds. The terminal device may, for example, specify the information on the communication quality corresponding to the frequency condition used by the terminal device itself to grasp the communication quality predicted in the communication using such frequency condition. Note that the information regarding the communication quality may be a value indicating the communication quality itself, or may be any information related to the communication quality, such as a statistical value including an average, a variance of the like of values indicating a plurality of communication qualities, a value indicating whether a predetermined control process may be executed with such communication quality, and the like.

Note that the base station may manage information regarding the corresponding communication quality for each of the plurality of frequency conditions. Thus, the base station may easily provide to the terminal device, information regarding the communication quality corresponding to the frequency condition that may be used by the terminal device. In one example, the base station may select information to provide among the information regarding the communication quality corresponding to each of a plurality of frequency conditions based on a signal received from the terminal device of the information providing destination. For example, the signal received from the terminal device of the information providing destination may indicate information indicating a frequency condition available to the terminal device. In this case, the base station may provide, to the terminal device, information regarding the communication quality corresponding to at least a part of the available frequency conditions. In this case as well, the base station may provide information regarding the communication quality along with information indicating the corresponding frequency condition. When information regarding a plurality of communication qualities corresponding to each of a plurality of frequency conditions is provided to the terminal device, the terminal device may recognize to what frequency condition each of the plurality of communication quality information corresponds. Thus, the terminal device may specify the frequency condition available to the terminal device, for example, and acquire information regarding the communication quality corresponding to the relevant frequency condition. Furthermore, for the signal received from the terminal device of the information providing destination, the base station may specify the frequency condition used for transmission of the signal and provide information regarding the communication quality corresponding to the frequency condition to the terminal device. Thus, information regarding a communication quality corresponding to a frequency condition in which the terminal device may transmit a signal may be provided to the terminal device.

The base station may collect the communication quality in the communication with a first terminal device connected in the past and the frequency condition in the communication, and provide the above information to a second terminal device currently existing around or being in connection, based on the collected information. Note that the base station may acquire information indicating the position of the first terminal device upon collecting the information. That is, it is assumed that the cell formed by the base station covers a wide geographic region. In this case, for example, it is assumed that the communication quality differs between immediately below the base station and the cell end depending on the position in the wide region. Thus, the base station may collect communication quality and frequency condition for each position of the terminal device by acquiring the information on the position of the first terminal device.

The base station may acquire the weather information corresponding to the position where the first terminal device communicated. The base station may acquire the weather information for each position from, for example, the first terminal device or may acquire the weather information from a server disclosing the information on the weather through the Internet or the like. The base station may correct the value of the collected communication quality according to the weather at the time of communication with the first terminal device. For example, if the weather is rain and it is assumed that the communication quality is degraded in at least some frequency conditions, the value of the communication quality may be corrected to be high by that degradation. That is, the base station may compensate for the weather degradation of the value of the communication quality based on the weather information, such that, for example, the value of the communication quality when the weather is sunny is reflected in the information regarding the communication quality. Note that while an example has been described in which information regarding communication quality is generated based on a case where the weather is sunny, information regarding the communication quality may be generated based on a case where the weather is rain or cloudy. The base station may correct the value of the communication quality based on the weather information, and then generate information regarding the communication quality to be provided to the second terminal device.

Furthermore, the base station may acquire the weather information at the current position for the second terminal device which is the information providing destination. Furthermore, the information regarding the communication quality provided to the second terminal device may be generated based on the correction value of the communication quality collected for the communication by the first terminal device and corrected according to the weather at the position of the first terminal device and the weather information at the current position of the second terminal device. For example, in a case where the communication quality is corrected based on a case where the weather is sunny, if the weather at the current position of the second terminal device is rain, the base station further corrects the correction value of the collected communication quality in consideration of the influence of rain, and generates information regarding the communication quality. For example, the information regarding the communication quality that takes into consideration the influence of rain may be generated by lowering, by a predetermined value, the value of the communication quality obtained by correcting, based on a case where the weather is sunny, the value of the communication quality corresponding to the frequency condition in which the communication quality is assumed to degrade by rain.

Note that the frequency condition includes information indicating a frequency used in the communication by the first terminal device. The base station may then correct the information regarding the communication quality corresponding to the relatively high frequency to indicate a lower value than the collected communication quality, and generate information regarding the communication quality. Thus, the second terminal device may recognize that the communication quality is low for a relatively high frequency, and therefore, may use a relatively low frequency. The radio quality of the radio waves in a relatively high frequency band often degrade rapidly due to the effect of shielding or the like than the radio waves in a relatively low frequency band. Thus, the second terminal device may improve the probability that stable communication may be performed by using a relatively low frequency.

Furthermore, the frequency condition currently includes information indicating a frequency used for communication by a third terminal device different from the second terminal device. Therefore, the second terminal device may recognize whether or not the terminal device other than the second terminal device is using the relevant frequency or the adjacent frequency at each frequency. When the terminal device other than the second terminal device is using the relevant frequency or the adjacent frequency for a certain frequency, the second terminal device may evaluate that there is a possibility of being subjected to interference when such frequency is used, and may determine to use a frequency of a better condition. When the third terminal device uses the frequency or the adjacent frequency for a certain frequency, the base station may correct the communication quality corresponding to the frequency condition indicating the relevant frequency to be relatively unfavorable, and generate information regarding the communication quality.

Hereinafter, an example of a configuration of a base station and a flow of processes for performing the processing described above will be described below.

Figure 2:
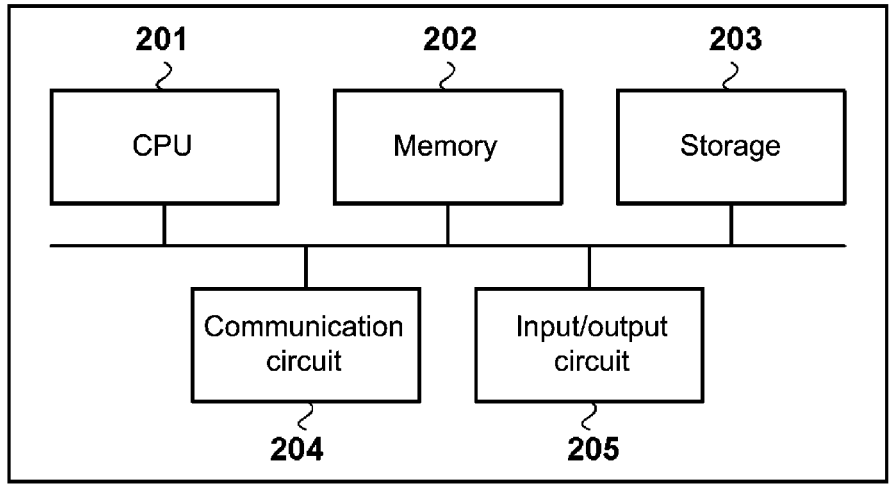
FIG. 2 is a view illustrating a hardware configuration example of a base station in accordance with one aspect of the present disclosure.

FIG. 2 illustrates an example of a hardware configuration of a base station according to the present disclosure. The base station may be a general purpose computer in one example, and includes, for example, a CPU 201, a memory 202, a storage 203, a communication circuit 204, and an input/output circuit 205. The CPU 201 executes, for example, a program stored in the memory 202 to perform processes described below and control of the entire device. Note that the CPU 201 may be replaced by any one or more processors, such as an MPU or an ASIC. The memory 202 holds a program for causing the base station to execute various processes, and also functions as a work memory during program execution. The memory 202 is, in one example, RAM (random access memory) and ROM (read-only memory). The storage 203 is, for example, a removable external storage, a built-in hard disk drive, or the like, and holds various types of information. The communication circuit 204 performs signal processing related to communication, acquires various information from the external device through the communication network, and transmits the various information to the external device. Note that the information acquired by the communication circuit 204 may be stored, for example, in the memory 202 and the storage 203. Note that the base station may include a plurality of communication circuits 204. For example, the base station may include a wired communication circuit for communication with network nodes in the core network and other base stations, and a wireless communication circuit for communication with the terminal device (e.g., operates according to the cellular communication standard such as 5G and LTE). Note that the base station may, in one example, establish the X2 interface and directly communicate with the other base stations, or may communicate with the other base stations via the core network using the S1 interface. Furthermore, the base station may establish radio links and perform communication with other devices for connection with other base stations and core networks. The base station may include a communication circuit for communicating with each of the supported communication standards. The input/output circuit 205 controls, for example, output of image information to be displayed on a display device (not illustrated) and audio information to be output from a speaker, and acceptance of user input through a keyboard, a pointing device, or the like. Note that the input/output circuit 205 may control a device that performs input/output integrally such as a touch panel. The configuration of FIG. 2 is an example, and for example, a base station may be configured by dedicated hardware to perform the processes described above.

Figure 3:
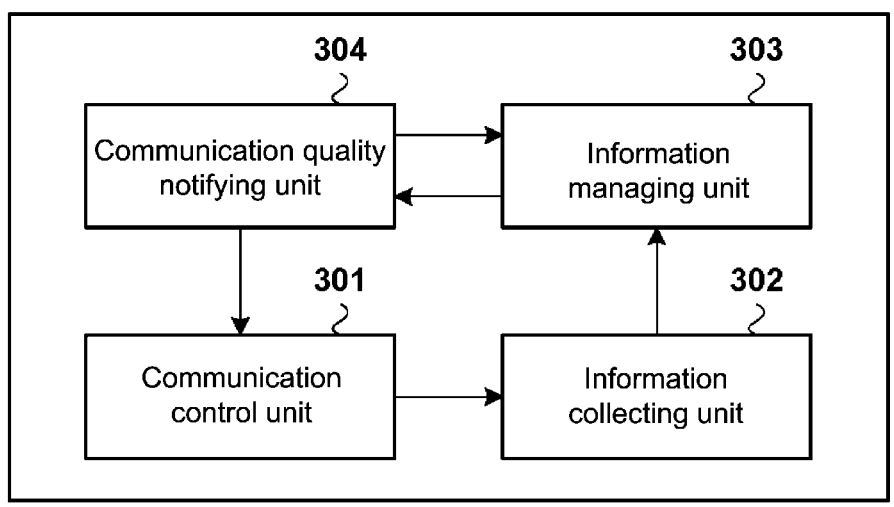
FIG. 3 is a view illustrating a functional configuration example of the base station in accordance with one aspect of the present disclosure.

FIG. 3 illustrates an example of a functional configuration of a base station according to the present disclosure. The base station includes, as an example, a communication control unit 301, an information collecting unit 302, an information managing unit 303, and a communication quality notifying unit 304.

The communication control unit 301 performs execution control of the communication for collecting information and notifying information. For example, the communication control unit 301 performs control for establishing a radio link and performing communication with the first terminal device to collect information. The communication control unit 301 may establish a communication link for providing information to the second terminal device. Furthermore, the communication control unit 301 may perform a control to establish a communication link to the opposing device of the communication of the first terminal device and the second terminal device to perform communication.

The information collecting unit 302 collects, through the communication control unit 301, communication quality including a communication delay of a communication link of the communication by the first terminal device. The information collecting unit 302 may acquire, by measurement, the communication quality, such as radio quality and communication delay, with respect to the communication with a radio link established with the first terminal device. Furthermore, the information collecting unit 302 may acquire, by measurement, for example, a communication quality in a communication link through an external device such as an operator device of the remote operation and the base station between the network node on the core network and the first terminal device. Note that when acquiring the communication quality, the information collecting unit 302 may acquire information indicating the frequency conditions used in the radio link established between the base station and the first terminal device in the communication. The information collecting unit 302 may acquire the information on the position of the first terminal device in the communication. Note that the information collecting unit 302 may execute information collecting over a plurality of times for the communication by the plurality of first terminal devices.

The information collecting unit 302 may collect the actually measured communication quality in the communications at various frequency conditions by collecting information in the communication by multiple first terminal devices. The information collecting unit 302 may reduce errors in the actually measured communication quality in the communication by the terminal device by executing information collecting over multiple times with the first terminal device. Note that the base station may acquire information regarding the communication not passing through the base station itself. For example, the base station may acquire information collected by other base stations and information aggregated in other devices such as network nodes.

The information managing unit 303 manages information collected by the information collecting unit 302. The information managing unit 303 may, for example, manage communication quality for each frequency condition. The information managing unit 303 may manage information on the position of the terminal device when the communication quality is obtained. In this case, the information managing unit 303 may manage communication quality for each combination of frequency condition and position. The information managing unit 303 may, for example, manage multiple communication qualities as is when multiple communication qualities are collected for one frequency condition (or combination of frequency condition and position), or may manage a value that is not the collected communication quality itself specified from the multiple communication qualities such as an average or variance of multiple communication qualities. The information managing unit 303 may manage the information on the communication quality in the form of information related to the communication quality transmitted to the second terminal device. In this case, as described above, the communication quality to manage may be corrected to be different from the actual communication quality according to the frequency conditions, weather conditions, and the like.

The communication quality notifying unit 304 notifies the second terminal device of information on the communication quality corresponding to at least one frequency condition and information indicating the frequency condition through the communication control unit 301. At this time, in a case where the information managing unit 303 manages information in the form of information related to the communication quality to provide to the second terminal device, the communication quality notifying unit 304 acquires information regarding the communication quality corresponding to the frequency condition to be transmitted from the information managing unit 303, and transmits the information to the second terminal device. Furthermore, in a case where the information managing unit 303 manages information on the communication quality in a form other than the form of notifying to the second terminal device, the communication quality notifying unit 304 generates and transmits information regarding the communication quality in a form of notifying the second terminal device based on the information acquired from the information managing unit 303. In this case, the communication quality notifying unit 304 may correct the communication quality being managed in accordance with the frequency conditions, weather conditions, and the like, as described above, and then generate information to be provided. Note that the communication quality notifying unit 304 may select information to provide to the second terminal device based on a signal received from the second terminal device, for example, through the communication control unit 301.

Next, an example of a flow of processes executed by the communication system according to the present disclosure will be described in FIG. 4.

Figure 4:
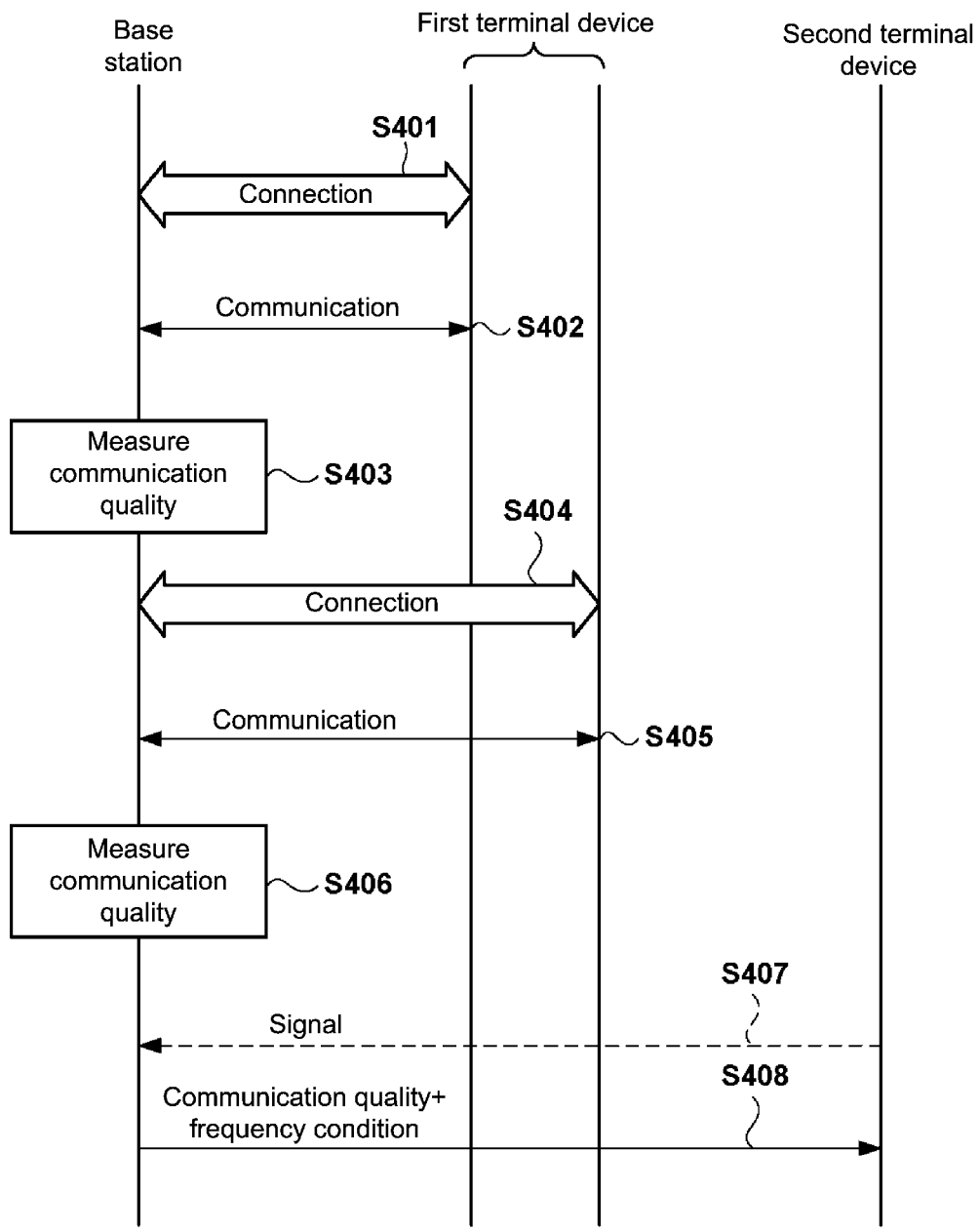
FIG. 4 is a view illustrating an example of a flow of processes executed by a communication system in accordance with one aspect of the present disclosure.

FIG. 4 illustrates an example of a case in which the base station acquires, by measurement, communication quality in a communication by the first terminal device with the first terminal device connected to the base station to perform communication. In this process, for example, the base station establishes a connection with a plurality of first terminal devices (S401, S404), and the first terminal device performs communication through the base station (S402, S405). Then, in the communication, the base station measures and acquires the communication quality such as communication delay (S403, S406). At this time, the base station also acquires information indicating the frequency condition used in the communication. Note that the base station may measure the communication quality associated with the communication between the base station and the first terminal device, but may also, for example, measure and acquire the communication quality associated with the communication in the communication link including a wireless section and a wired section between the first terminal device and the communication opposing device thereof such as the operator device of the remote operation when the first terminal device is an in-vehicle terminal device of a remote operation vehicle, and the like. Note that the base station may further collect the position of the first terminal device, the weather information at that position during communication, and the like. In this manner, the base station may collect information on the communication quality for the communication by the terminal device connected to the base station itself, and associate and manage the information with the information indicating the frequency conditions in the communication. Note that the base station may manage information on the corrected communication quality based on the frequency conditions, weather conditions, and the like. The base station may acquire, from other base stations and network nodes, information regarding the communication quality in the communication not passing the base station, and information indicating a frequency condition corresponding to the relevant communication quality.

Thereafter, the base station provides, to the second terminal device, information regarding the communication quality generated based on the collected communication quality value itself or the communication quality value (S408). At this time, the base station provides, along with the information regarding the communication quality, a frequency condition corresponding to the communication quality to the second terminal device. Note that the base station may specify the frequency condition of the information to be provided on the basis of the signal (S407) from the second terminal device, and provide the communication quality for the specified frequency condition to the second terminal device. The signal may be, for example, a signal that requests for provision of a communication quality. Note that, for example, the base station may notify, for each frequency corresponding to the frequency condition, whether the third terminal device is communicating at that frequency or the adjacent frequency as information indicating the frequency condition. The base station may correct the communication quality being managed on the basis of the level of frequency, weather conditions corresponding to the position of the second terminal device, and the like, and provide the information regarding the corrected communication quality to the second terminal device along with the corresponding frequency condition.

As described above, according to the present disclosure, the base station provides information regarding communication quality and information indicating frequency conditions to the terminal device. The terminal device may perform communication using the frequency condition, in which sufficient communication quality is expected to be obtained, based on the information regarding the communication quality in each frequency condition. For example, the terminal device may request the base station for communication at a frequency condition with good communication quality. Note that the terminal device not connected to the base station may also acquire the information described above by broadcasting the information provision as described above. In this case, for example, the terminal device may execute the process for handover to a base station with good communication quality in the frequency conditions currently used by the base station itself. Furthermore, the terminal device may also set a processing level regarding a predetermined control process to be executed by, for example, lowering the level of remote operation, based on the information regarding the communication quality.

Note that in the above description, the base station collects the communication quality and the frequency condition, and notifies the terminal device of the information indicating the frequency condition and the information regarding the corresponding communication quality, but the present disclosure is not limited thereto. For example, devices other than base station, such as network nodes on the core network, may collect and provide information. Furthermore, for example, the terminal device may collect information and provide information to other terminal devices. Similarly, the processes described above may be executed in an environment other than the cellular communication network. For example, information indicating the actually measured communication quality and information indicating the corresponding frequency condition may be collected and provided subject to the wireless LAN. That is, for example, information on the actually measured communication quality in the communication with a communication standard supported by a communication device, in which the communication quality is to be measured, may be collected and provided.

According to one aspect of the present disclosure, a communication device is provided. The communication device may include a memory for storing computer readable code and a processor operatively coupled to the memory, the processor configured to perform processes. The processes may include receiving information regarding a communication quality of communication of a first other communication device and information regarding a frequency condition of the communication and providing the information regarding the communication quality of the communication by the first other communication device and the frequency condition of the communication to a second other communication device. The second other communication device may perform communication using the communication quality and the frequency condition by the first other communication device.

The communication device according to the above, wherein the processor, operatively coupled to the memory, is configured to manage the information regarding the communication quality for a plurality of frequency conditions.

The communication device according to the above, wherein the processor, operatively coupled to the memory, is configured to receive a signal from the second other communication device before providing the information.

The communication device according to the above, wherein the information provided to the second other communication device is selected using the signal received from the second other communication device.

The communication device according to the above, wherein the signal includes a frequency condition available by the second other communication device.

The communication device according to the above, wherein the processor, operatively coupled to the memory, is configured to provide, to the second other communication device, information regarding a communication quality corresponding to the available frequency condition and a frequency condition corresponding to the communication quality.

The communication device according to the above, wherein the processor, operatively coupled to the memory, is configured to provide, to the second other communication device, information regarding a communication quality corresponding to a frequency condition used for transmitting the signal.

The communication device according to the above, wherein the processor, operatively coupled to the memory, is configured to receive information indicating a position of the first other communication device.

The communication device according to the above, wherein the processor, operatively coupled to the memory, is configured to: receive weather information corresponding to the position, and generate information to provide to the second other communication device based on the weather information and a communication quality of the communication by the first other communication device.

The communication device according to the above, wherein the processor, operatively coupled to the memory, is configured to: receive weather information at a position of the second other communication device and generate information regarding the communication quality to provide to the second other communication device based on the weather information at the position of the second other communication device.

The communication device according to the above, wherein providing the frequency condition to the second other communication device includes providing information indicating a frequency used in the communication by the first other communication device.

The communication device according to the above, wherein the processor, operatively coupled to the memory, is configured to generate a high frequency to indicate a communication quality lower than the communication quality.

The communication device according to the above, wherein the frequency condition includes information indicating a frequency used by a third other communication device different from the second other communication device.

In accordance with yet another aspect of the present disclosure, a communication device is provided. The communication device may include a memory storing instructions when executed by a processor causes the processor to perform processes. The processes may include receiving information regarding a communication quality of communication of a first other communication device and information regarding a frequency condition of the communication and providing the information regarding the communication quality of the communication by the first other communication device and the frequency condition of the communication to a second other communication device. The second other communication device may perform communication using the communication quality and the frequency condition by the first other communication device.

The communication device according the above, wherein providing the frequency condition to the second other communication device includes providing information indicating a frequency used in the communication by the first other communication device.

The communication device according to the above, wherein the memory storing instructions when executed by the processor causes the processor to generate a high frequency for the frequency condition to indicate a communication quality lower than the communication quality.

The communication device according to the above, wherein second other communication device uses a relatively low frequency after receiving the frequency condition.

In accordance with yet another aspect of the present disclosure, a computer-implemented handover method in a communication device is provided. The method may include receiving information regarding a communication quality of communication of a first other communication device and information regarding a frequency condition of the communication and providing the information regarding the communication quality of the communication by the first other communication device and the frequency condition of the communication to a second other communication device. The second other communication device may perform communication using the communication quality and the frequency condition by the first other communication device.

The computer-implemented handover method according to the above, including managing the information regarding the communication quality for a plurality of frequency conditions.

The computer-implemented handover method according to the above, including receiving a signal from the second other communication device before providing the information.

The computer-implemented handover method according to the above, wherein the information provided to the second other communication device is selected using the signal received from the second other communication device, the signal indicating a frequency condition available by the second other communication device.

The disclosure is not limited to the embodiments described above, and various modifications and changes may be made within the scope of the present disclosure.

The invention claimed is:

1. A communication device, comprising:
  a memory for storing computer readable code; and
  a processor operatively coupled to the memory, the processor configured to:
    receive first information regarding a communication quality of communication of a first other communication device and information regarding a frequency condition of the communication, wherein the frequency condition indicates a first frequency higher than a specific frequency range;
    generate second information regarding the communication quality corresponding to the first frequency by correction of a collected value of the communication quality in the received first information, wherein the second information indicates a value of the communication quality that is lower than the collected value of the communication quality in the received first information; and
    provide the second information regarding the communication quality corresponding to the first frequency to a second other communication device, wherein the second other communication device utilizes a second frequency lower than the first frequency to perform communication with the communication device.

2. The communication device according to claim 1, wherein the processor, operatively coupled to the memory, is configured to receive a signal from the second other communication device before providing the second information.

3. The communication device according to claim 2, wherein the second information provided to the second other communication device is selected using the signal received from the second other communication device.

4. The communication device according to claim 3, wherein the signal includes an available frequency condition available by the second other communication device.

5. The communication device according to claim 4, wherein the processor, operatively coupled to the memory, is configured to provide to the second other communication device, information regarding the communication quality corresponding to the available frequency condition and the frequency condition corresponding to the communication quality.

6. The communication device according to claim 3, wherein the processor, operatively coupled to the memory, is configured to provide, to the second other communication device, the second information regarding the communication quality corresponding to the frequency condition used for transmitting the signal.

7. The communication device according to claim 1, wherein the processor, operatively coupled to the memory, is configured to receive information indicating a position of the first other communication device.

8. The communication device according to claim 7, wherein the processor, operatively coupled to the memory, is configured to:
  receive weather information corresponding to the position; and
  generate the second information to provide to the second other communication device based on the weather information and the communication quality of the communication by the first other communication device.

9. The communication device according to claim 7, wherein the processor, operatively coupled to the memory, is configured to:
  receive weather information at a position of the second other communication device; and
  generate the second information regarding the communication quality to provide to the second other communication device based on the weather information at the position of the second other communication device.

10. The communication device according to claim 1, wherein providing the frequency condition to the second other communication device comprises providing information indicating a frequency used in the communication by the first other communication device.

11. The communication device according to claim 1, wherein the frequency condition includes information indicating a frequency used by a third other communication device different from the second other communication device.

12. A base station forming a cell for communications, the base station comprising:
  a memory storing instructions when executed by a processor causes the processor to:
    receive first information regarding a communication quality of communication of a first other communication device and information regarding a frequency condition of the communication within the cell, wherein the frequency condition indicates a first frequency higher than a specific frequency range;

generate second information regarding the communication quality corresponding to the first frequency by correction of a collected value of the communication quality in the received first information, wherein the second information indicates a value of the communication quality that is lower than the collected value of the communication quality in the received first information; and provide the second information regarding the communication quality corresponding to the first frequency to a second other communication device, wherein the second other communication device utilizes a second frequency lower than the first frequency to perform communication with the base station.

13. The base station according to claim 12, wherein providing the second information corresponding to the frequency condition to the second other communication device comprises providing information indicating the first frequency used in the communication by the first other communication device.

14. The base station according to claim 13, wherein the memory storing instructions when executed by the processor causes the processor to generate a specific frequency to indicate the communication quality lower than the communication quality specified in the received first information, and the specific frequency is higher than a frequency indicated by the frequency condition.

15. The base station according to claim 13, wherein the second other communication device uses the second frequency that is lower than the first frequency indicated by the frequency condition after receiving the frequency condition.

16. A computer-implemented handover method in a communication device, the computer-implemented handover method comprising:

receiving first information regarding a communication quality of communication of a first other communication device and information regarding a frequency condition of the communication, wherein the frequency condition indicates a first frequency higher than a specific frequency range;

generating second information regarding the communication quality corresponding to the first frequency by correction of a collected value of the communication quality in the received first information, wherein the second information indicates a value of the communication quality that is lower than the collected value of the communication quality in the received first information; and providing the second information regarding the communication quality corresponding to the first frequency to a second other communication device, wherein the second other communication device utilizes a second frequency lower than the first frequency to perform communication with the communication device.

17. The computer-implemented handover method of claim 16, further comprising storing, in a memory, the first information regarding the communication quality for a plurality of frequency conditions.

18. The computer-implemented handover method of claim 16, comprising receiving a signal from the second other communication device before providing the second information.

19. The computer-implemented handover method of claim 18, wherein the second information provided to the second other communication device is selected using the signal received from the second other communication device, the signal indicating an available frequency condition available by the second other communication device.

* * * * *